US010872195B2

(12) United States Patent
Soon-Shiong et al.

(10) Patent No.: US 10,872,195 B2
(45) Date of Patent: Dec. 22, 2020

(54) LINK ASSOCIATION ANALYSIS SYSTEMS AND METHODS

(71) Applicant: Nant Holdings IP, LLC, Culver City, CA (US)

(72) Inventors: Luke Soon-Shiong, Los Angeles, CA (US); Patrick Soon-Shiong, Los Angeles, CA (US)

(73) Assignee: Nant Holdings IP, LLC, Culver City, CA (US)

(*) Notice: Subject to any disclaimer, the term of this patent is extended or adjusted under 35 U.S.C. 154(b) by 0 days.

(21) Appl. No.: 16/885,141

(22) Filed: May 27, 2020

(65) Prior Publication Data

US 2020/0285802 A1    Sep. 10, 2020

Related U.S. Application Data

(63) Continuation of application No. 16/588,538, filed on Sep. 30, 2019, now Pat. No. 10,706,216, which is a
(Continued)

(51) Int. Cl.
*G06F 40/134* (2020.01)
*G06F 16/22* (2019.01)
(Continued)

(52) U.S. Cl.
CPC ......... *G06F 40/134* (2020.01); *G06F 16/22* (2019.01); *G06F 16/958* (2019.01);
(Continued)

(58) Field of Classification Search
CPC .................................................. G06F 40/134
See application file for complete search history.

(56) References Cited

U.S. PATENT DOCUMENTS 6,877,137 B1  4/2005 Rivette et al.
7,016,532 B2  3/2006 Boncyk et al.
(Continued)

FOREIGN PATENT DOCUMENTS

CN  1701343 A  11/2005
CN  1726512 A  1/2006
(Continued)

OTHER PUBLICATIONS

Ames et al., "Richer File System Metadata Using Links and Attributes," Proceedings of the 22nd IEEE / 13th NASA Goddard Conference on Mass Storage Systems and Technologies (MSST'05), pp. 1-12. (Year: 2005).*
(Continued)

*Primary Examiner* — Amelia L Tapp
(74) *Attorney, Agent, or Firm* — Mauriel Kapouytian Woods LLP; Lana Akopyan; Michael Mauriel (57) ABSTRACT

Link association analysis systems are presented. Disclosed systems are configured to analyze links created by users and to determine possible reasons underpinning why a user would create such a link. The system derives such reasons by analyzing the context within which the link was created and to which the link points, and then presents the reasons as a data object to users for feedback. The system can be made to be self-refining by collecting survey data regarding its accuracy, so that the more users interact with the system, the more accurate the system is at deriving reasons for link creation.

23 Claims, 3 Drawing Sheets

Related U.S. Application Data continuation of application No. 16/166,025, filed on Oct. 19, 2018, now Pat. No. 10,430,499, which is a continuation of application No. 15/900,731, filed on Feb. 20, 2018, now Pat. No. 10,108,589, which is a continuation of application No. 15/485,156, filed on Apr. 11, 2017, now Pat. No. 9,916,290, which is a continuation of application No. 14/770,075, filed as application No. PCT/US2014/016994 on Feb. 18, 2014, now Pat. No. 9,659,104.

(60) Provisional application No. 61/768,989, filed on Feb. 25, 2013.

(51) Int. Cl.
| | | |
|---|---|---|
| *G06F 16/958* | (2019.01) | |
| *G06F 16/955* | (2019.01) | |
| *G06Q 30/02* | (2012.01) | |
| *G06Q 50/00* | (2012.01) | |
| *G06Q 30/06* | (2012.01) | |
| *H04L 29/08* | (2006.01) | |

(52) U.S. Cl.
CPC ......... *G06F 16/9566* (2019.01); *G06Q 30/02* (2013.01); *G06Q 30/0601* (2013.01); *G06Q 50/01* (2013.01); *H04L 67/306* (2013.01)

(56) References Cited

U.S. PATENT DOCUMENTS

| | | |
|---|---|---|
| 7,343,324 B2 | 3/2008 | Lao et al. |
| 7,477,780 B2 | 1/2009 | Boncyk et al. |
| 7,565,008 B2 | 7/2009 | Boncyk et al. |
| 7,680,324 B2 | 3/2010 | Boncyk et al. |
| 7,775,437 B2 | 8/2010 | Cohen |
| 7,953,735 B2 | 5/2011 | Yamamoto et al. |
| 8,195,592 B1 | 6/2012 | Heidenreich et al. |
| 8,224,078 B2 | 7/2012 | Boncyk et al. |
| 8,234,311 B2 | 7/2012 | Miyazaki |
| 8,374,871 B2 | 2/2013 | Ehsani et al. |
| 8,457,395 B2 | 6/2013 | Boncyk et al. |
| 8,463,031 B2 | 6/2013 | Boncyk et al. |
| 8,478,578 B2 | 7/2013 | Ehsani et al. |
| 8,583,416 B2 | 11/2013 | Huang et al. |
| 8,656,266 B2 | 2/2014 | Cierniak |
| 9,152,969 B2 | 10/2015 | Borgs et al. |
| 9,411,860 B2 | 8/2016 | Castellanos et al. |
| 9,659,104 B2 | 5/2017 | Soon-Shiong et al. |
| 9,916,290 B2 | 3/2018 | Soon-Shiong et al. |
| 10,108,589 B2 | 10/2018 | Soon-Shiong et al. |
| 10,430,499 B2 | 10/2019 | Soon-Shiong et al. |
| 10,706,216 B2 | 7/2020 | Soon-Shiong et al. |
| 2007/0088720 A1 | 4/2007 | Neuneier et al. |
| 2008/0154577 A1 | 6/2008 | Kim et al. |
| 2009/0187537 A1 | 7/2009 | Yachin et al. |
| 2010/0049709 A1 | 2/2010 | Ravikumar et al. |
| 2011/0161323 A1 | 6/2011 | Hagiwara |
| 2012/0054240 A1 | 3/2012 | Zhang et al. |
| 2012/0137201 A1 | 5/2012 | White et al. |
| 2012/0221561 A1 | 8/2012 | Brown et al. |
| 2014/0019443 A1 | 1/2014 | Golshan |
| 2015/0180966 A1 | 6/2015 | Villaron |

FOREIGN PATENT DOCUMENTS

| | | |
|---|---|---|
| CN | 102163211 A | 8/2011 |
| JP | 2000-357170 A | 12/2000 |
| JP | 2004355340 A | 12/2004 |
| JP | 2006172489 A | 6/2006 |
| JP | 2006185334 A | 7/2006 |
| JP | 200794551 A | 4/2007 |
| JP | 2012123681 A | 6/2012 |
| KR | 10-0801662 B1 | 2/2008 |
| KR | 10-2009-0090840 A | 8/2009 |
| KR | 10-1180371 B1 | 9/2012 |
| WO | 2011156272 A1 | 12/2011 |
| WO | 2012074661 A1 | 6/2012 |
| WO | 2012088720 A1 | 7/2012 |

OTHER PUBLICATIONS

International Search Report and Written Opinion issued in International Patent Application No. PCT/US2014/016994 dated Jun. 26, 2014, 13 pages.

Whelan et al., "Boeing Timing & Location, An Indoor Capable Time Transfer and Geolocation System," Boeing, Presentation Stanford PNT Symposium, Nov. 2011, 16 pages.

Extended European Search Report issued in European Patent Application No. 14754468.8 dated Sep. 13, 2016, 6 pages.

Kenekayoro et al., "Motivation for Hyperlink Creation Using Inter-Page Relationships," 2013, pp. 1253-1269.

Bar-Ilan, "A microscopic link analysis of academic institutions within a country—the case of Israel," Scientometrics, 2004, vol. 59, No. 3, pp. 391-403.

Thelwall et al., "What is this link doing here? Beginning a fine-grained process of identifying reasons for academic hyperlink creation," Information Research, 2003, vol. 8, No. 3, 17 pages.

McKenzie et al., "User-generated online content 1: Overview, current state and context," First Monday, Jun. 4, 2012, vol. 17, No. 6, 26 pages.

Vondrick et al., "Predicting Motivations of Actions by Leveraging Text," Computer Vision Foundation, 2016, pp. 2997-3005.

Office Action issued in Chinese Patent Application No. 201480023522.1 dated May 15, 2017, 4 pages.

Notice of Reasons for Rejection issued in Japanese Patent Application No. 2015-558913 dated Jan. 9, 2018, 5 pages.

Communication issued in European Patent Application No. 14 754 468.8 dated Feb. 8, 2018, 7 pages.

Bar-Ilan, "What do we know about links and linking? A framework for studying links in academic environments," Information Processing and Management, 2005, vol. 41, Issue 4, pp. 973-986.

Decision of Patent issued in Japanese Patent Application No. 2018-125678 dated May 8, 2019, 4 pages.

Result of Consultation issued in European Patent Application No. 14 754 468.8 dated Sep. 18, 2019, 7 pages.

Office Action issued in European Application No. 14 754 468.8 dated Jan. 10, 2020, 18 pages.

Office Action issued in Australian Application No. 2019202770 dated Feb. 14, 2020, 3 pages.

Office Action issued in Korean Application No. 10-2015-7026852 dated Feb. 17, 2020, 14 pages.

Office Action issued in Japanese Patent Application No. 2019-105224 dated Sep. 23, 2020, 3 pages.

* cited by examiner

LINK ASSOCIATION ANALYSIS SYSTEMS AND METHODS

This application is a continuation of U.S. application Ser. No. 16/588,538, filed Sep. 30, 2019, which is a continuation of U.S. application Ser. No. 16/166,025 filed Oct. 19, 2018, which is a continuation of U.S. application Ser. No. 15/900,731 filed Feb. 20, 2018, which is a continuation of U.S. application Ser. No. 15/485,156 filed Apr. 11, 2017, which is a continuation of U.S. application Ser. No. 14/770,075 filed Aug. 24, 2015, which is the U.S. National Stage of International Application No. PCT/US2014/016994 filed Feb. 18, 2014, which claims the benefit of priority to U.S. provisional application 61/768,989 filed Feb. 25, 2013. These and all other referenced extrinsic materials are incorporated herein by reference in their entirety.

FIELD OF THE INVENTION

The field of the invention relates to systems that construct and manage objects that represent reasons in the creation of links.

BACKGROUND

The following background discussion includes information that may be useful in understanding the present invention. It is not an admission that any of the information provided herein is prior art or relevant to the presently claimed invention, or that any publication specifically or implicitly referenced is prior art.

Understanding the rationale behind choices that are made by an individual provides deep insight into the individual's interactions with an environment. The information gained from an individual's reasoning can be used to learn, predict, or correct the choices made by an individual. Such information can be a powerful tool in many areas, such as social media, education, or advertising.

One example of obtaining a rationale for a choice made by a user can be found in U.S. Pat. No. 8,195,592 to Heidenreich. Heidenreich teaches a system that allows a user to create links between thinking components and to provide an explanation of the relationship between the thinking components. A second user could then analyze this link and explanation, and then could provide a second explanation that refines and develops the first user's thinking process. However, Heidenreich fails to provide information regarding why either user created the linked associations in the first place.

PCT Pub. No. 2012/088720 to Zheng teaches a system that generates social recommendations by linking users to one another based upon the online behavior of its users. While Zheng's system may link users who share the same mindset, Zheng's system also fails to provide any information regarding why any of the users would create similar linked associations.

Pat. Pub. No. 2012/0137201 to White teaches a system that predicts what kinds of links a user might click upon when web browsing. White analyzes a user's historical web patterns and then predicts how that user will browse a web in the future based upon that user's past behavior. Like the other known art, White fails to provide any information regarding why the user would create each link.

Overall, each of the examples listed above fail to recognize the value in exploring the full scope of the rationale in choices made by users. Rather, the examples merely disclose setting up associations or predicting a possible link of interest. An improved system would offer insight into the rationale behind why people make linked associations in the first place in order to resolve possibly ambiguous meanings underpinning the links.

Thus, there is still a need for a system that derives and maintains reasons why users create links.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which a link association analysis system generates an association reason object based upon the context of a linked object.

A link object includes a data structure stored on a computer media and that comprises a pointer to a linked content, a web page perhaps, and a link creator identifier that identifies the creator of the link. Exemplary pointers include uniform resource locators (URLs), network addresses, email addresses, phone numbers, bookmarks, networking contacts, an application program interface (API), windows shortcuts, short cuts, UNIX symbolic links, or other types of machine understandable addresses. The pointer can be generated by a user of the system or a user, or the system could automatically generate the pointer based upon provided content. For example, the system could track a user's actions for referencing content in a specific manner, such that when the user references content via a "cut-and-paste" set of actions, the system can generate a link object pointing to that linked content and identifying the user as the link creator. The link object is typically stored within a link database, which could be a memory accessible to the association analysis system and that is configured to store one or more link objects.

Exemplary content includes off-line content (i.e., content that is locally stored, possibly in on a data store of the computer system) or on-line content (i.e., content accessible by the computer system over a network). The content could have one or more kinds of data of interest to a user, such as text data, audio data, video data, image data, kinesthetic data, metadata, location data, time data, ambient data, real-time data, biometric data, or other types of content.

A link analysis engine can analyze one or more aspects of the link object in order to determine the link object's context; that is the circumstances of how the link object is used. The context can be derived from various attributes related to the environment in which the link object exists, possibly including the location (e.g., social media page, blog post, product reviews, etc.) where the pointer is displayed or embedded, rendered, or otherwise presented; the content to which the pointer points; attributes of the pointer; attributes of the link creator; the method used to present the link object; or attributes of the link content itself. An exemplary context relates to the location of where the pointer (or link) is presented (i.e. a website containing a link to a URL where the content is located) and the linked content itself. For example, the linked content could be presented in the form of a post to a bulletin board, forum, or other type of network-accessible database. Exemplary posts include video posts, forum posts, comment posts, articles, social networking posts, commenting threads, reviews, or other types on-line posts. The context could have on-line or off-line content or could be derived from on-line or off-line content. Attributes of the link creator could be accessible via a link creator profile detailing attributes of the link creator, which may or may not be associated with the link object.

Once the link analysis engine analyzes aspects of the link object to discern the context of the linked object, the link analysis engine can instantiate an association reason object. The association reason object is a data object that represents at least one reason the link creator made the association between the referenced content and the location where the link is displayed. An exemplary association reason object could represent a mapping of the context to a conceptual reason or ontology. Such a conceptual reason can be normalized across one or more concept maps to allow a user of the system to track a reason pattern for the link owner, groups of individuals, common owners of a plurality of link objects, or other portions of a population. Conceptual reasons can classified into one or more reason classification schemes, such as a humor class, a technical class, an educational class, a religion class, a political class, a referral class or even a NULL class. NULL classes can be used for reason objects that cannot be classified into one of the known reason classes or as a template, which could then be passed onto a user or a separate system for generation of a new reason class. Reason classes could be further divided into sub-classes; possibly according to an ontological hierarchy, for example a reason in a humor class could be sub-divided into types of humor (e.g., sarcasm, situation, observation-based, absurd, etc.) or a reason in a political class could be sub-divided into political affiliations (e.g., Republican, Democrat, Libertarian, etc.).

A user interface is typically installed on a computer system to allow a user to gain access to the link association analysis system, which may or may not reside upon the same computer system as the user interface (e.g., workstation, web server, etc.). Exemplary computer systems that present the user interface include mobile phones, tablets, televisions, set top boxes, appliances, kiosks, media player, game consoles, augmented reality rigs (e.g., phones, cameras, glasses, etc.) or vehicles. The user interface is preferably functionally coupled to the link analysis engine in some way (e.g., HTTP, SaaS, PaaS, IaaS, etc.), and could be configured to allow a user to interact with the link association analysis system in a variety of ways. For example, the user interface could be configured to allow a user to define an interaction with the association reason object, define a new class, re-define a class of a known conceptual reason, input ontology, input a concept map, or select a link object for analysis by the engine, or otherwise manage association reason objects.

In an exemplary embodiment, the user interface interacts with, or is a part of a social networking site, such as Facebook™, LinkedIn™, Match.com™, Angieslist™, or other social media portal. In some embodiments, the user's interaction with the user interface defines the interaction with the association reason object through an action with the social networking site, such as subscribing to a creator of content, notifying an entity of content, performing a transaction, conveying a sentiment, or posting content to the social networking site. For example, if a user of a social media website such as Facebook™ conveys a sentiment (e.g., like, dislike, neutral feelings, etc.) of a linked content created by a "friend" on the social networking site, the user interface could then use that conveyed sentiment to define the interaction with the association reason object. Such sentiments could convey any preference for a variety of attributes associated with the linked content, for example a preference for the link creator or a preference associated with the association reason object.

The user interface could also be configured to present the association reason object to another program or to another user in a variety of manners. The user interface could further be configured to allow the link analysis engine to generate an association reason object based upon one or more questions posed to a user. For example, a survey could be presented which asks each user why that user believes a link was created having one or more attributes of the link object. In other embodiments, the link analysis engine could be configured to generate an association reason object by searching for reason object templates as a function of attributes associated with the context and/or the linked content. Such reason object templates could be gleaned from a variety of different types of sources, such as other social media sites, forums, news articles, or other database structures. The link analysis engine could even populate a reason object template based upon a link creator profile, the context, the linked content, attributes of any of the aforementioned, or a combination of the aforementioned.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media (e.g., hard drive, computer memory, CD, DVD, etc.) storing the instructions that cause a processor to execute the disclosed steps that fulfill the disclosed roles or responsibilities. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the disclosed techniques provide many advantageous technical effects including controlling computing device behaviors based on association reason objects. The association reason objects can cause the computing devices to take one or more actions, possibly including selectively rendering content, providing statistics, engaging in on-line purchases, or other interactions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. In the context of networked devices, the terms "coupled to" and "coupled with" and used euphemistically to mean "communicatively coupled with" where two or more computing devices are able to exchange data with each other over network links, possibly via one or more intermediary devices.

Figure 1:
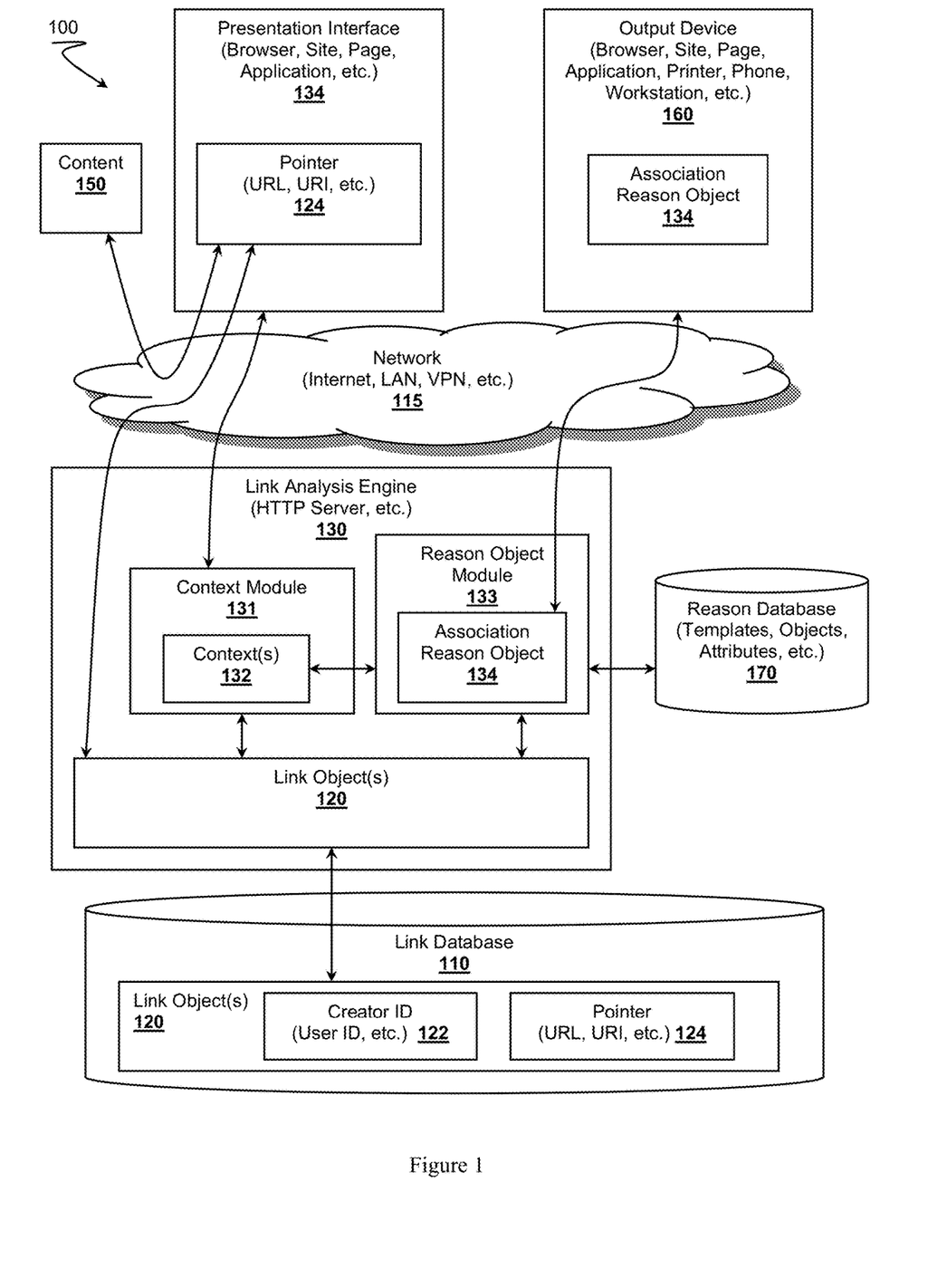
FIG. 1 is a schematic of an exemplary link association analysis system.

In FIG. 1, illustrates exemplary link association analysis system 100. As illustrated, link association analysis system 100 comprises a link database 110 and a link analysis engine 130. Link database 110 is configured or programmed to store one or more link objects 120 representing links among various content. In some embodiments, system 100 can also include one or more of reason database 170. Link analysis engine 130 has roles or responsibilities directed to deriving one or more reasons underpinning why a user created a link to content 150.

As an example, consider a scenario where a person is reviewing posts on a forum, perhaps on reddit.com or digg.com via a web browser as represented by presentation interface 140. The person might submit a post that links to external content 150 in response to content on the forum in an attempt to be funny or sarcastic. Unfortunately, the other readers might not be aware that the link is meant to be sarcastic. Rather, the other readers could take the link as being mean or as being serious, which could give rise to a "flame war" or excessive "noise" in the forum. Link analysis engine 130 leverages the information or context associated with the link in an attempt to derive a possible underlying reason that motivated the person to create the link in the first place. The context can include information relating to content 150, content surrounding the link (e.g., other forum posts, thread topics, etc.), information associated with the person, reader reactions, or other parameters. The reason is represented as association reason object 134, possibly presented on another forum reader's browser as depicted by output device 160.

Link database 110 is configured to store one or more link objects, such as link object 120 that contains link creator identifier 122 and a pointer 124 to linked content 150. Link database 110 can use an indexing scheme derived from a namespace that could be defined by features or attributes extracted from linked content 150, link creator identifier 122, pointer 124, or from the link presentation interface 140. Such features and attributes could be normalized in accordance with a classification schema before being stored within link database 110 to aid in streamlining the analysis process. Link creator identifier 122 can include data representative of the entity (e.g., human, user, consumer, computer, etc.) that creates the link. Example link creator identifiers can include a user name, a user ID (e.g., GUID, UUID, etc.), an email address, a social security number, a digital signature, a hash value, or other type of value that represents an entity. Pointer 124 represents an address that "points" to or "links" to content 150. For example within a web-based context, pointer 124 could include a HTTP hyperlink that links to content 150 located on the Internet. The nature of pointer 124 can also vary depending on the environment in which link object 120 exists. Examples of pointer 124 can include URLs, URIs, IP address, HTTP links, protocol addresses (e.g., port assignments, etc.), logical block addresses, file names, digital object identifiers, domain names, memory locations, hash-based addresses (e.g., BitTorrent addresses, BitCoin addresses, etc.), or other types of addresses. More preferred aspects of pointer 124 include encoding pointer 124 in computer understandable form that allows link analysis engine 130 to access content 150 via pointer 124.

It should be appreciated that although link object 120 is presented as a distinct, manageable data object within link database 110, link object 120 can take on a broad spectrum of forms. In some embodiments, link object 120 can include a record in link database 110 as indexed according to a suitable schema where link creator identifier 122 and pointer 124 are fields of the record. In other embodiments, link object 120 could also comprise embedded content within a web page. For example, link object 120 could be a review with links embedded within a product web page served by Amazon®. The review could include a link to external content 150. Link object 120 could also represent embedded content such as a post on a social media site. In such embodiments, link database 110 can be embodied as one or more web servers offering web services through which a link creator can provide links via presentation interface 140.

Link object 120 can also include additional information beyond link creator identifier 122 and pointer 124 that offers link analysis engine 130 access to context information related to link object 120. For example, link object 120 could also include user-provided content, perhaps as a body of a blog post or a product review. Further examples include authentication or authorization information (e.g., passwords, user ID, public keys, etc.) that could enable link analysis engine 130 to access content 150 on a remote secured sever. Still further examples include one or more attributes and possibly corresponding values that describe the nature of link object 120. Additional link object attributes could include time stamps, device position, device orientation, device or user location (e.g., GPS coordinates, triangulation coordinates, etc.), biometric information, or other types of data. Exemplary information that can be contained within link object 120, possibly as part of link creator identifier 122, could include the name, age, gender, political affiliation, employment status, or other characteristic information of the link creator. Thus, link analysis engine 130 could determine a broad or granulated context 132 depending upon the data analyzed in relation to link creator identifier 122.

As illustrated, link analysis engine 130 is presented as a separate, distinct computing system from presentation interface 140, output device 160, link database 110, and reason database 170. In some embodiments, link analysis engine 130 operates as a service, perhaps as a for-fee service, that offers its web-base services to other internet-based servers. In other embodiments, the link analysis engine 130 can be integrated within other platforms as one or more installable modules. For example, link analysis engine 130 can be integrated as a plug-in within a social media site, product review site, or other type of web-based site.

Generally, a link creator will create a pointer 124 to linked content 150 to be presented upon some sort of link presentation interface 140, within a browser or even an application. Contemplated link presentation interfaces 140 include social networking sites, internet forums, browsers, bulletin boards, news media outlets, blogs, computer folders, or other known link aggregators. Pointer 124 could be presented in a variety of forms, such as a uniform resource locator (URL), an email address, a network address, a phone number, a bookmark, a networking contact, an application program interface (API) or any other type of format that links to linked content 150. Programs associated with the link presentation interface 140 may create link object 120 containing information about pointer 124, such as a copy of pointer 124, metadata regarding linked content 150, link creator identifier 122, metadata regarding the link creator, metadata regarding how the link creator generated pointer 124, and metadata regarding how the link creator posted pointer 124 to presentation interface 140.

In other embodiments, link analysis engine 130 could be configured to detect when pointers are created on link presentation interface 140 and can then generate link object 120 within link database 110 as a function of information gleaned by link analysis engine 130. For example, link analysis engine 130 could detect when a user posts a comment on a social media site where the post includes pointer 124. Such information could be gleaned from link presentation interface 140, linked content 150, or any other repository of information, such as a search engine or a profile database. In some embodiments, the link presentation interface 140 might not contain a pointer at all, but may instead contain linked content 150 itself, or may contain a reference to linked content 150, in which case link analysis engine 130 could be configured to generate a corresponding pointer 124 automatically. For example, if link presentation interface 140 is a blog having an article with a poem, link analysis engine 130 could analyze link presentation interface 140, identify the poem, create a link object 120 having a link creator identifier 122 that identifies the author of the blog, and create a pointer 124 that links to the poem or information about the poem via link presentation interface 140.

Link analysis engine 130 is configured to analyze link object 120 to determine its context within the environment in which link object 120 finds itself. One aspect of the context could include data that represents how pointer 124 is presented in link presentation interface 140 relative to attributes of linked content 150. In contemplated systems, the context can be determined using a context determination module 131 within link analysis engine 130. Context determination module 131 can collect one or more pieces of data relating to the environment from various sources. For example, context determine module 131 obtain information relating to the link creator (e.g., profile information, user name, history, etc.), the content surrounding pointer 124, or even content 150 to which pointer 124 points. Of particular interest, context determination module 131 determines context 132 related to the location where pointer 124 is presented the linked content 150. Thus, context determination module 131 can determine a contextual juxtaposition between content 150 and the surrounding content where pointer 124 is placed.

Context 132 can be considered a data object having one or more attributes relating to the nature of how pointer 124 is presented. In some embodiments, the attributes of context 132 can include basic attributes having a name and a value. Such attributes and corresponding values can be automatically pulled from content 150 or other sources. For example, in a scenario where pointer 124 is presented within a chat window of a video game, the context can comprise attributes that represent the location of the presented pointer (e.g., the name of the game, the current activity within the game, the type of game, the number of players, a time, etc.) and that represent the nature of content 150 (e.g., original source or poster of content 150, the sentiment associated with content 150, key words or concepts from content 150, etc.). In other embodiments, context 132 can represent a derived construct based on the information available. Context determination module 131 can map information obtained from the various sources available to one or more context templates. As a more concrete example, context determination module 131 can compile key words from content 150 can map the key words to a context template via a look up table, phrase thesaurus, or other technique. The template can then be populated based on the data available from the sources.

Context 132 can be considered a quantified description of a circumstance related to the link. The context could represent one or more of the following: a shopping context, an educational context, a work or office context, a travel context, entertainment context, an on-going context, or other types of contexts. Context 132 can reflect one or more types of content; on-line content or off-line content. The context 132 can reflect or even include one or more of the following types of content: text data, audio data, video data, image data, kinesthetic data, metadata, location data, time data, ambient data, or any other sort of modality. Still further, local content in presentation interface 140 could influence context 132 can comprise a video post, a forum post, a comment post, an article, a social networking post, a comment thread, a review, or other information from the location where the link was posted or made.

Once the link analysis engine 130 has determined context 132 for link object 120, link analysis engine 130 can generate an association reason object 134 derived from context 132. Thus, the nature of how link object 120 is used in relation to its surrounding content and link content 150 can be leveraged to estimate an underlying reason for creation of the link.

One should recognize that the association reason object 134 is considered a representation for a reason that an association was made, and as such could have one or more attributes associated with such a reason. An association reason object module 133 could be used by link analysis engine 130 to generate such an association reason object 134, which is presented to a user via output device 160. Note that output device 160 could also operate as presentation interface 140. In some embodiments, a single context 132 could generate a plurality of valid or potential association reason objects 134. One or more of the generated association reason objects could be presented to a user via output device 160. Using such an embodiment, a link creator could then review each of the possible association reason objects 134 and select a most preferred association reason object as the most likely reason that a link creator identified linked object 150. In some embodiments, link analysis engine 130 could store previously selected association reason objects within link database 110 or a separate association reason database 170 using a normalized indexing schema.

In this way, as a user (or a plurality of users) can search association reason objects associated with an attribute (such as a link creator, a category of link creators, or the link itself), the system could "remember" the most common association reason objects associated with a link creator, or a category of link creators, and then the system could prioritize the most commonly picked association reason object associated with the attribute at the top of the list. In some embodiments, the system could be configured to automatically select the highest-priority association reason object in the list of association reason objects generated by the context. Thus, the disclose system can be considered to give rise to a 'reason' search engine capable of providing search results indicative 'why' or the intent behind creating links.

In view that context 132 can be representative of the surrounding content within presentation interface 140 and link content 150, one can consider association reason object 134 as content that bridges the two pieces of information together. In some embodiments, context 132 could be represented by a matrix of concepts. The dimensions of the matrix can represent concepts presented in content 150 and concepts presented in the surrounding content within presentation interface 140. Each cell of the matrix can include one or more rules by which association reason object 134 is instantiated, possibly as influence by link creator profile information. For example, a cell might be indexed by concept labels as "games", "product", "politics", "religion", "comic strips", "physics", or other concepts. Perhaps if the concepts from content 150 lean strongly toward "comic strips" and the concepts from the surrounding content leans toward "politics", then the matrix cell located at the intersection of "politics" and "comic strips" would include rules for generating a humor or sarcastic reason object. The history of the link creator could influence how association reason object 134 is instantiated. If other readers have typically rated the creator as being sarcastic in the past, then reason module 133 can instantiate associating reason object 134 as a data construct with attributes indicating that the derived underlying reason for creating the link was to be humorous with a note of sarcasm.

In contemplated systems, association reason object 134 could comprise a mapping to a conceptual reason, such as an ontology or a concept map. For example, the ontology could be used to represent a variety of reasons (e.g. a humorous response, an mathematical reason, a philosophical reasons, an emotional reasons, educational reason, motivational reason, a medical or healthcare reasons, a factual reason, etc.) and a concept map could represent concepts in several respects that lead to a reason (e.g. a membership to a comedy club causes a link creator to create more humorous links, or a threshold number of other links, such as likes on a Facebook™ page, on a famous mathematician's site causes a link creator to create more mathematical links). Conceptual reason mapping could be done using a variety of logic languages (e.g., Common Logic, F-Logic, and KL-ONE). The conceptual reason could also be presented as a normalized conceptual reason by using language normalization and abstractions, such as those listed in US 2002/0128821 to Ehsani, US2008/0154577 to Ehsani, US20090177461 to Ehsani, and US2009/0171662 to Huang, each of which are incorporated herein by reference.

Furthermore, the conceptual reason could comprise a reason classification. In contemplated systems, the reason classification could include at least one of the following reason classes: humor, technical, educational, political, referral, or NULL (i.e., no reason was determined). The reason classification could also include sub-classes. For example, a reason class of humor can include the following types of sub-classes: situational, sarcastic, ironic, or observation-based, absurd, or other subclass. Users could find this level of specificity beneficial when they feel that a reason class is too broad. It should be appreciated that a reason classification could include several reason classes and sub-classes if need be, preferably according to one or more hierarchies. Where a reason class is defined as NULL, in some embodiments, a user could be presented with a user interface which allows the user to associate the association reason object with an existing reason class or subclass, or even define a new reason class or subclass for use in the system.

In some embodiments, the reason classification system can be domain specific where the reasons map to a specific type of subject matter. The examples previously discussed mainly relate to social networking or product reviews. However, in embodiments that are directed to more specific areas association reason object 134 will also take on more specific values. For example, in the medical domain, the reason classification system can include information relating to diagnosis or treatments for designated ailments. Perhaps a doctor includes a link in a patient's medical record where the link points to content related to a prescribed drug. The associated reason object for the link could indicate a reason for alleviating a symptom or curing the ailments. Other domains that can leverage reason classification systems include gaming domains, shopping domains, financial domains, travel domains, educational domains, science domains, healthcare domains, art domains, or other types of domains.

In addition to mapping association reason object 134 to a conceptual reason, the link analysis engine 130 can be further configured to generate the association reason object 134 as a function of a survey of users, possibly through use of a mechanical turk infrastructure (e.g., Amazon® MTurk™). Using this technique, users input an indication representing a reason that they believe caused the link to be created. In some embodiments, the user can be presented with a ranked list of the most likely reason for a link creator to generate or post link pointer 124. The results of the survey could be used as (a) the sole determinant of the association reason object 134 or (b) an influence or a function of the instantiation of the association reason object 134 possibly according to a weighting function. It should be appreciated that the surveys can be presented to a portion of the viewership to reduce possible disruption of the enjoyment of the associated content.

In other embodiments, the link analysis engine 130 could utilize one or more reason object templates stored in reason database 170, which provide functions that could either (a) be a sole determinant to generate association reason object 134 based upon attributes associated with context 132, or (b) be an influence to a function of the generation of association reason object 134 based upon attributes associated with context 132. In some embodiments, link database 110 could also operate as reason database 170. Further, reason database 170 could be implemented as an in-memory data store or structure of link analysis engine 130.

Link analysis engine 130 could be configured to enable an output device 160 to present association reason object 134 at any suitable time. Thus, association reason object 134 can be viewed by others within the environmental context in which link object 120 was created. Exemplary output devices 160 could include at least one of a mobile phone, a tablet, a television, a set top box, an appliance, a kiosk, a computer display, and a vehicle. Similarly, the presentation of the association reason object 134 could vary with respect to the output device 160 or with respect to a preference by the user of the output device 160. For example, association reason object 134 could be presented in visual form upon a computer display (such as a mobile phone), in sound form through a sound system, perhaps a Bluetooth® sound system, or in tactile form upon a tactile display such as a refreshable Braille display.

Output device 160 could also be configured to allow one or more users to interact with or manage association reason object 134, for example analyzing association reason object 134, modifying association reason object 134, or modifying an association reason template used to instantiate the association reason object 134. Output device 160 and link presentation interface 140 could be the same user interface, allowing the link creator to not only define a link, but also define the association reason object 134 or an attribute of association reason object 134. Contemplated link presentation interfaces 140 that allow a user to both create a pointer 124 to linked content 150 and also interact directly to modify association reason object 134 include user interfaces to social networking sites, such as Facebook™, Linkedin™, or Angie's List™.

In contemplated embodiments, output device 160 could provide a variety of interactions (or select such interactions from a list) with either link object 120 or with association reason object 134. Exemplary interactions include at least one of a subscription action, a notification action, a transaction, and a sentimental action. A subscription action can be described as an action that allows users to receive something in a regular basis (e.g., a daily email containing the links generated by the link creator based on a humor reason classification). A notification action can be an action that alerts users via a message or sound when a condition is met (e.g., an alarm on a mobile phone if a comment is posted to the link object). A transaction can an interaction associated with an account related to association reason object 134. A sentimental action is an action that demonstrates a feeling/opinion on something (e.g., showing a like or dislike for a linked object).

Figure 2:
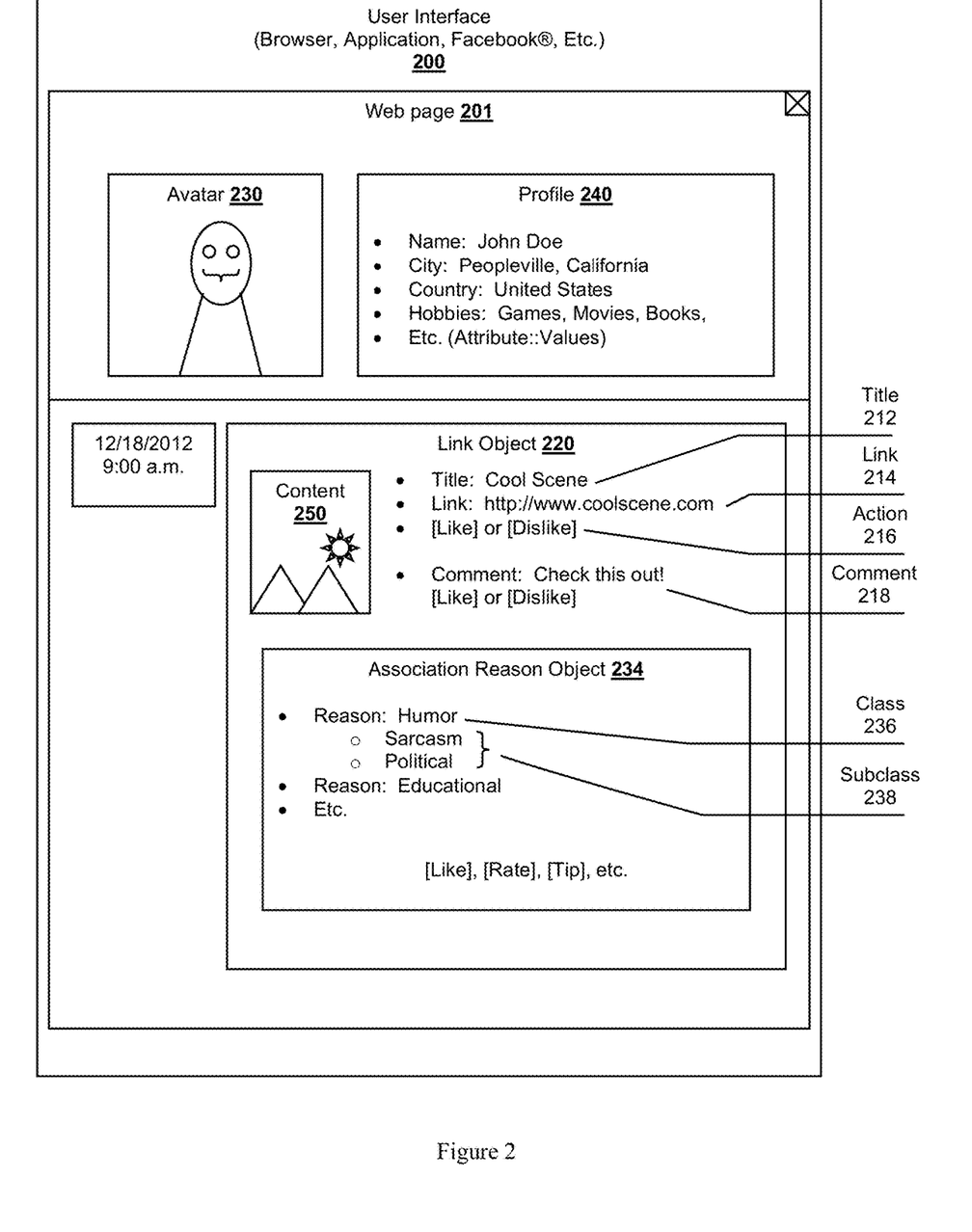
FIG. 2 shows an exemplary user interface that shows a link analyzed by a link association analysis system of the present invention.

FIG. 2 shows a mock up of a possible user interface 200 through which a user can create or otherwise interact with association reason object 234. User interface 200 is illustrated as a browser displaying webpage 201 of an exemplary profile for a user of a social networking site. In this example, the user, represented by avatar 230 and profile 240, posts a link 214 (e.g., see pointer 124 in FIG. 1) to his or her social media landing page. Link 214 and its associated content are represented by link object 220. In this example, the user is the link's creator. Link object 220 includes link 214, title 212, comment 218, perhaps a condensed representation of content 250, or other features. Link object 220 further includes association reason object 234, which is indicative of the underlying reason for creating link 214. Based on information derived from content 250, local information, and possibly profile 240, the link analysis engine has classified association reason object 234 in to class 236 (i.e., humor) and into subclass 238 (i.e., sarcasm and political). Of particular note, association reason object 234 can include multiple reasons or even multiple subclasses for a single class.

A link association analysis system could then analyze the context within which the link creator created link 214 to create link object 220 having attributes associated with the link, for example the name of the social networking site, a unique identifier of the link creator, the link/pointer itself, the title of the link, any comments posted by the link creator regarding the link, the class of the link, the subclass of the link, or any other suitable content. The link creator or a user of the social networking site could then assign a sentimental action 216 (e.g., like, dislike, thumbs up, tip, etc.) to the link, a comment regarding the link, or the categorical class assigned to the link. Any of these could be associated with the context, link object, or the association reason object by the system. Various other attributes could be recorded and utilized by the system to create a context that assists the system in determining one or more association reason objects derived from the context.

One should appreciate the dynamic nature of link 214. As presented in FIG. 2, link 214 is illustrated as a traditional hyperlink. However, link 214 could represent a broad spectrum of association types between a source object or a circumstance, and one or more destination objects. Contemplated association types vary by the nature through which link 214 is formed. In some embodiments, the link 214 can be formed by the link creator through indirect or direct construction of a hyperlink as shown where link 214 can be embedded in a source document (e.g., web page) and point to an external source document (e.g., another web page, video, image, sound, file, application, purchase, etc.).

Link 214, or even link object 220, can also be formed through interactions between the link creator and the environmental objects (e.g., billboards, magazines, toys, television, movies, music cases, parts, vehicles, buildings, etc.). For example, the link creator can capture a digital representation of the object (e.g., an image, a video, a sound, etc.) and bind or link the digital representation of the object to additional information or content (e.g., messages, other images, games, purchases, etc.). Thus, one aspect of the inventive subject matter can include creating links via object recognition based on one or more data capture modalities. Example techniques that can be leveraged for object linking or reorganization and adapted for use with the inventive subject matter includes those described in co-owned U.S. Pat. Nos. 7,016,532; 7,477,780; 7,680,324; 7,565,008; 7,775,437; 8,224,078; 8,463,031; and co-owned U.S. patent application publications 2012/0250942.

Still further link 214, or link object 220, can be created based on other forms of interactions. In more preferred embodiments, link 214 can be established based on a transaction between the link creator's circumstance (i.e., the context) and a target object. Example transactions can include conducting a financial transaction with an account (e.g., on-line account, bank account, credit card account, mortgage account, etc.), redeeming a coupon, accepting or rejecting offers or promotions, exchanging healthcare data with a healthcare provider (e.g., electronic medical records, privacy, prescriptions, etc.), enforcing or engaging security measures (e.g., passwords, key exchanges, etc.), engaging in point-of-sales activities (e.g., making a payment, near field communication, participating with games or game objects (e.g., gambling, video games, computer games, etc.), or other forms of transactions. Even further, other interactions beyond transactions can include listing to music, playing games, making calls, watching television, or other types of interactions.

Yet further, link 214 can be established based on one or more conditions with respect to a context. The context, as discussed previously, represents link object 220 or link creator's relationship with the environment. In some embodiments, link 214 is only created, established, or otherwise instantiated when conditions within the context indicate the system or creator is allowed to create link 214. Thus, a context can be considered to include one or more sets of linking condition criteria that are to be satisfied as authentication of the link creator or creator's device, or authorization to create link 214. Each set of linking condition criteria can be bound to one or more types of links or association types. As example, a first set of linking condition criteria might be less restrictive and only apply to humor-type associations while a second set of linking condition criteria might be more restriction and only apply to relationship-based emotional-type links.

The linking condition criteria can be defined as a function across a broad landscape of available environment data. Physical location data represents an example of environment data that can be used to authenticate or authorize the link creator to create link 214. Physical location data should not be configured with a placement location of content in an interface. Physical location data can be obtained from internal sensors within the link creator's device (e.g., accelerometers, GPS, camera, Skyhook®, etc.) or from external sensors (e.g., security cameras, etc.). In some embodiments, location data can derived based on visual information obtained from a camera sensor. For example, a cell phone can capture video data and use vSLAM, triangulation, or other mapping techniques to determine location of the creator's device. The location data can also be obtained internal to buildings or other structures using non-GPS systems. For example, location data can be obtained using satellite-based signals with power penetration capable of penetrating buildings, possibly based on Iridium satellites (e.g., 66 LEO satellites, Boeing Timing and Location (BTL) services, etc.) without relying on GPS. Thus, the linking condition criteria can be defined based on location coordinates. When the link creator or the creator's device has a location that satisfies the location-based conditions, the link creator can be allowed to create link 214. Example location-based conditions can include geofences, relative positions or locations, movement from one location to another, or other location-based conditions. Additional examples of environment data that can be used to authenticate or authorized link creator or the creator's device can include time (e.g., absolute, relative, etc.), gestures (e.g., sign language, accelerometer data, etc.), images (e.g., sequence of images, video, etc.), biometrics (e.g., facial recognition, iris, retina, fingerprint, heart beat, galvanic response, etc.), radar (see URL phys.org/news/2012-09-radar-technology-housed-thumb-tack-sized-chip.html), or other types of environment data. One should further appreciate that the linking condition criteria can include a required criterion or an optional criterion that should be satisfied to authenticate or authorize a link creator to create link 214.

Regardless of the foundational association type for association reason object 234 behind link 214, the reasons for association can be derived from the context under which link 214 was created. The reason can be represented as association reason object 234 comprising class 236 and subclass 238. One should appreciate that the context can be based on the source of the external content as represented by a hyperlink or content 250 and the destination of the link as represented by webpage 201, as well as the context of the link creator. Consider a scenario were a link creator buys a birthday present for a friend from a product purchasing web site. The analysis engine recognizes that the link creator is in a "shopping" context based on the creator's activities, possibly with a sub-context of "birthday shopping" and perhaps an even further refined context of "birthday shopping for friend", and observes a purchase of the gift. The act of initiating a transaction can cause link object 220, including link 214, to be created within the person's social media page. The analysis engine can observe attributes of the gift (e.g., size, shape, name, brand, etc.) relative to the shopping context and attributes of the friend (e.g., likes, dislikes, preferences, gender, etc.). The analysis engine might infer that the link among the objects (e.g., friend's birthday and creator's purchase of a gift) is that the gift is intended to be a joke gift. In response, the analysis engine could create an association reason object 234 reflecting that the "purchase" link is a humor reason. Such information can then be stored for later retrieval for searching or later analysis.

Link 214 can be a uni-directional link or a bi-directional link. A uni-directional link can be considered a pointer (see FIG. 1, pointer 124) that points from a source point to a destination point. A hyperlink or a purchase of a type of product would be considered uni-directional links. A bi-directional link can be considered a link that provides pointers among multiple objects. For example, a link object 220 that includes a pointer from a first object (e.g., web page) to a second object (e.g., external content) and a pointer from the second object (e.g., the external content) back to the first object (e.g., the web page) would be a bi-directional link. Further, link 214 can represent a one-to-one link, a one-to-many link, or even a many-to-many link.

It should be appreciated that each link in the chain can also have a corresponding association reason object 234. In a very real sense, the chain of association reason objects 234 can be considered a flow of thought or reasoning behind creating such associations. The chains of association reason objects 234 can be analyzed to form mind maps related to the creator(s) and among contexts. The mind maps can then be compared to other creators' mind maps. A mind map can comprise a series of nodes (e.g., the environment where a pointer of link object 220 resides) and an edge connecting the nodes (i.e., link 214). Each node in the map can be characterized by the context as discussed previously.

One should appreciate that link 214 can also be considered visible or non-visible. In the example shown, link 214 is visible because it is visually presented as a hyperlink. Non-visible links can be represented by link objects, but not necessarily presented visually to others. As mentioned previously, link 214 could represent a purchase of an object. Such a link might not be visually presented, but could be accessed via a link association search engine for analysis.

Figure 3:
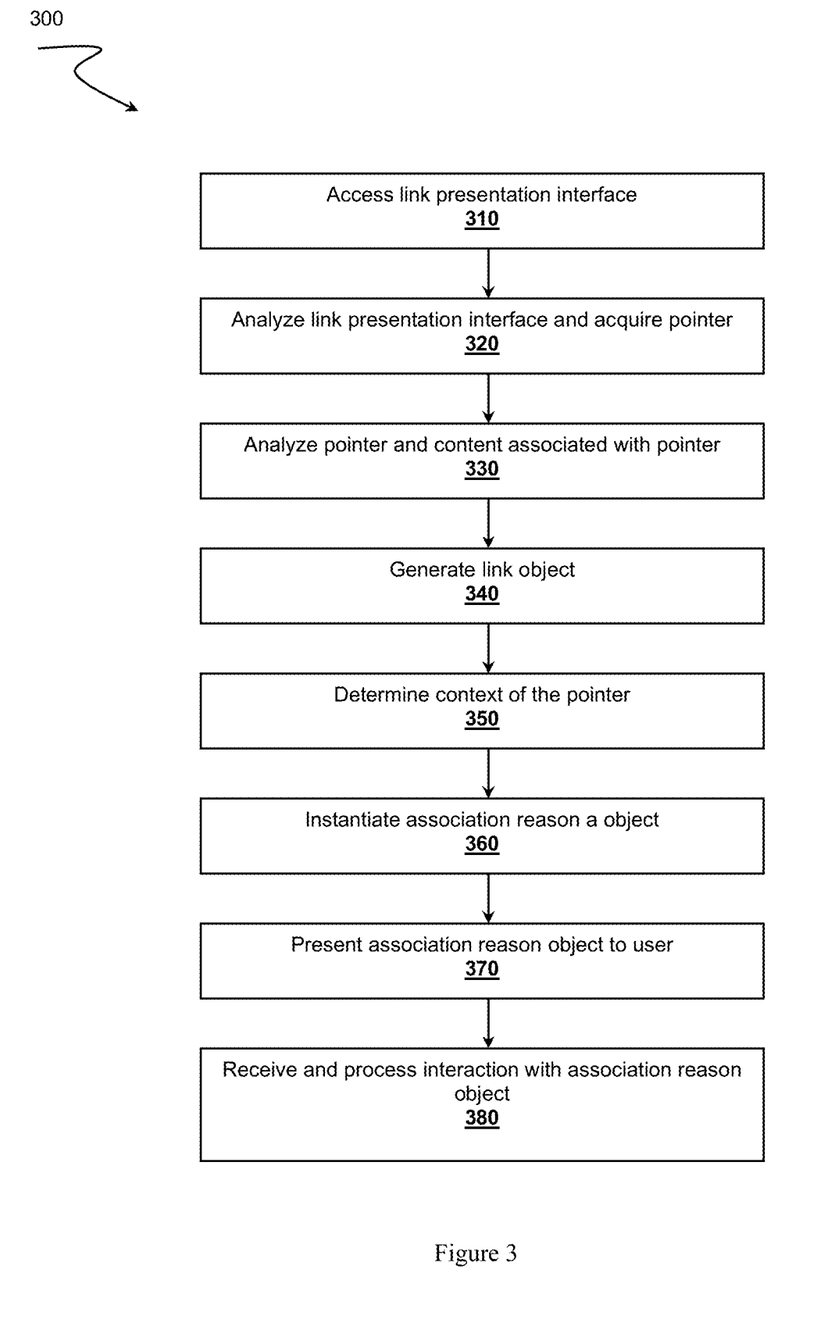
FIG. 3 illustrates possible steps that could be used by link association analysis system of the present invention.

FIG. 3 illustrates method 300 for interacting with association reason objects. It should be understood that method 300 includes one or more steps executed by one or more computing devices possibly operating as a link analysis engine as described above. The services provided by the link analysis engine can be offered as a for fee service possibly as a PaaS, IaaS, SaaS, or other type of service.

In step 310, a link analysis engine accesses a link presentation interface, through one or more different techniques. In some embodiments, the link analysis engine is integrated with a web service (e.g., web site, web server, social networking site, etc.) operating as a link presentation interface. As the web service provides content to a user, the link analysis engine can also monitor the presented content. In other embodiments, the link analysis engine operates as a separate plug-in or even a remote web service where the engine accesses the presentation interface via one or more HTTP-based protocols. The link presentation interface can be considered a website (e.g., social networking site, product review site, blog, video game, etc.) that is also accessible to one or more users. The users of such sites are able to leverage the capabilities of the site to create one or more links to external content. It should be appreciated that a link analysis engine is able to collect link data from one or more such presentation interfaces, possibly in real-time. For example, the engine could collect data on a periodic basis (e.g., daily, hourly, every five minutes, as links are created, etc.).

In step 320, the system then analyzes the link presentation interface to acquire a pointer associated with a link. Typically the pointer is a hyperlink within content of the link presentation interface. In an embodiment relating to product reviews, the link might be embedded in a product review or comments section of web page relating to a product of interest. The link itself might point to an offsite or external content (e.g., an image, text, a video, Wikipedia® article, etc.) and could comprise an embedded hyperlink. As discussed previously, the pointer can take on different forms, which could include Universal Resource Locators (URLs), Uniform Resource Identifiers (URIs), IP address, file names, memory pointers, or other types of pointers. The acquired pointers aid the link analysis engine to determine the link context between the content referenced by the link and the local content where the pointer exists. It should be appreciated that the pointer can be considered part of a link object as discussed above, which could also be stored in a link database. A link object could include a comment field, a message post, a standalone data object, a web page, or other type of data construct that comprises a pointer. In some embodiments, the link analysis engine is able to generate the pointer from the information available from the local content. For example, the analysis engine could surmise that a review article references a book title where no link is provided to the book. In response, the engine can automatically generate a pointer to a web page having the corresponding book or even to a Wikipedia® page. As another example, consider a scenario where a link creator mentions a popular news story from a news aggregator, the link analysis engine could use that information to generate a link or pointer to that popular news story by running a simple search on a network search engine.

In step 330, the analysis engine analyzes the pointer along with the content associated with the pointer to collect information relating to the environment associated with the created link. For example, the analysis engine can obtain authentication or authorization information so that the engine can gain access to the referenced content. Additional information beyond security information can also include a unique identifier of the link creator, an email address of the link creator, a network address of the link presentation interface, a phone number of the link creator, a type of link presentation interface, text data associated with the pointer, audio data associated with the pointer, video data associated with the pointer, image data associated with the pointer, kinesthetic data associated with the pointer, time data associated with when the pointer was created, ambient data associated with the link presentation interface, etc.

In some embodiments, at step 340, one or more devices optionally generate a link object having the information related to the created link. In some embodiments, the link analysis engine generates the link object as triggered by actions (e.g., placing a post, etc.) of the link creator. In other embodiments, the link object could be automatically a priori generated by crawling through digital content looking for links. Although step 340 is illustrated as being sequential between steps 330 and 350, it should be appreciated that at least step 340 could be performed out of the depicted sequence. The link objects preferably comprise a link creator identifier and a pointer to external content referenced by the object. As discussed above, the creator identifier can include user names, identification numbers, a machine address, a hash address, email addresses, GUIDs, digital signatures, or other types of identifiers. The link creator identifier allows the link analysis engine to obtain data associated with the entity that has decided to create the link. The pointer (e.g., URL, URI, address, digital object identifier, etc.) allows the link analysis engine to observe or access the external content.

In step 350, the link analysis engine leverages the information from the link object to determine a context in which the pointer of the link object exists. In more preferred embodiments, the context is derived from at least the content to which the pointer of the link object references and from the surrounding or local content in which the pointer is presented. Facebook® provides a foundation for an example. A Facebook user might post a comment on a friends profile or landing page where the comment includes an HTTP link to offsite content, perhaps a video on YouTube®. In this situation, the comment could be considered a link object where the HTTP link represents a pointer and the user's username represents the link creator identifier.

To continue the example, the link analysis engine can determine the context of link by examining the video, comments associated with the video on YouTube, or other content available via the HTTP link. This content can be examined using pattern recognition techniques (e.g., voice recognition, image recognition, OCR, speech to text analysis, or other digital data processing activities). Each activity can yield one or more attributes relating to the content that can be combined to form part of the overall context. For example, the link analysis engine could analyze frames of the video using image recognition techniques (e.g., SIFT, DAISY, etc.) to recognize objects or people. The engine can further search for or look up additional information relate to the recognized objects or people. Such information forms a portion of the link context because it represents the environment of the referenced content.

Continuing with the example, the link analysis engine can determine additional context information from the local content where the link resides. In this case, the link analysis engine can compile information local to the link (e.g., within the same posting), on the page, or other locations related to where the link is placed. The context of the link can be thought of as the juxtaposition of the context information from the external content and the context information local to where the link is placed. If the two sets of contexts are similar (e.g., having the same key words, sentiment, etc.), then the context might indicate an information exchange. If the two sets of context information are dissimilar (e.g., non-overlapping key words), then the context might indicate a non-informational exchange. It should be appreciated that the two contexts provide some insight into a reason for the link. However, yet more preferred embodiments leverage link creator information, which can color the overall context. Comparing and contrasting the two sets of context information with each other can be weighted by the link creator information.

As a more concrete example, consider an embodiment where context information comprises normalized names according to a context namespace where the names of the namespace correspond to concepts (e.g., positive sentiment, negative sentiment, location, time, etc.). The normalized names associated with the external content and the local link content can be indices into a context matrix, a look-up table, or other data store. The analysis engine can use the normalized concept names to retrieve rules or criteria for generating a reason object. The rules can include weighting factors that are influenced by the creator's profile information. The creator's age might influence the interpretation of a link reason from being informational to educational for example.

In step 360, the link analysis engine then generates an association reason object based upon the context. As discussed above, once rules for instantiating the association reason object have been established, the link analysis engine instantiates the reason object according to the rules. It should be appreciated that the reason object represents a digital data construct that can be independently managed from other reason objects. The reason information stored within the reason object can be populated based on the various sources of information including the external content, the context sets, the local content, creator information, historical information, or other factors.

In some embodiments, the context information can be used to retrieve a desirable reason object template from a reason database. Context information might indicate non-overlap between the external content and the local content. Based on a look up table, the rules for reason object instantiation might indicate a requirement for a humor-based reason object template. In response, the reason database provides such a template to the link analysis engine. The engine can then populate the template with appropriate attributes, possibly including reason classification or sub-classification information. In some embodiments, the association reason object can be populated with information based on feedback from other users. For example, the analysis engine might identify a link and then present users with a drop down list of possible reasons for the link's existence. As more users select reasons, the association reason object increases in validity.

In step 370 the link analysis engine then presents the association reason object to a user. The presentation of the association reason object can be as simple as presenting web content proximate to where the link is placed, where the web content is generated according to the association reason object. In other embodiments, a web site such as Amazon could call into an remote procedure call (RPC) or remote application program interface (API) to obtain the instantiated reason object. The reason object can be serialized possibly in a XML or JSON format and transmitted to the web site. The web site can then present the association reason object as consumable content to site visitors.

In step 380, one or more computing devices can receive or process interactions related to the association reason object. It should be appreciate that providing an underlying reason for a link gives rise to numerous opportunities for interactions. Such interactions could be generated via one or more interaction templates that dictate what interactions a given user could have with designated types of links, or links created by designated link creators. The system generally populates interaction fields from known object attributes of a link or of objects associated with a link, and hosts the interaction instance in a location accessible by the link analysis engine, such as the engine itself, a computer system that the engine is loaded upon, or a third party server. The system then generally instantiates an instance of an interaction as a function of attributes of the association reason object, and/or as a function of the device upon which the association reason object is presented. For example, a link association reason object presented on a mobile phone might have different available interactions than a link association reason object presented on a computer screen.

Contemplated interactions include modifying an interaction template, modifying an association reason template, subscribing to a link creator, setting an alert for a modification of data associated with the link (such as a new comment about the link, or a change to text displayed next to the link), performing a transaction with the link creator, or sending a sentiment to the link creator regarding the link. Another interaction could include providing monetary tips based on the association reason object. For example, a user can be presented with a tip interface for a crypto-currency (e.g., BitCoin, LiteCoin, PeerCoin, etc.) that allows for users to submit tips of perceived real-world value. In such embodiments, the association reason object can include one or more crypto-currency addressed through which a tip can be submitted to the link creator, the web site, or other entity.

One should appreciate the utility of identification and use of reason objects described above. Reason objects can be considered a quantification of link creator's intent. The intent can be described across a multi-dimensional intent space. The intent can represent humor, emotion, intent to inform, pattern of play with toys or friends, or other dimensions. In view that the reason objects represent intent or a reason through which a link is made, the reason objects can also be considered to represent the underlying thought processes of the creator, which can be further analyzed. The inventive subject is further considered to include mapping reason objects from an individual or a population to mental capabilities.

Mental capabilities can include cognitive ability, reasoning ability, emotional abilities, or other mental capabilities. Contemplated systems can establish a mental capability map based on an aggregate of reasoning objects where the capability map represents the thought processes through which individuals make connections among content. Possibly based on a statistical compilation, one can establish a normalized capability map across the population. As individuals interact with reasoning objects (e.g., create them, follow them, search for them, subscribe to them, etc.), the system can build a personalized mental capability map for the individual. The system can then compare the personalized mental capability map against the normalized capability map to determine differences. The differences could be determined based on filtered information; a comparison of only emotional reason objects or creation of reason objects during a single time periods for example.

The differences in capability maps have many advantageous features. For example, a normalized mental capability map could represent a standard for exhibiting emotion. If there are differences between the standard and a person's mental capability map, the differences might be leveraged as a diagnostics tool to identify emotional issues of the person. Similarly, the differences among mental capability maps could be used for diagnosing mental illness, identifying changes in metal state over time of a person, validating a person's improvement mentally or behaviorally, or other purposes.

The disclosed techniques give rise to many possible interesting uses, all of which are considered part of the inventive subject matter as discussed below.

Association reason objects bound a one or more users (e.g., individually, demographically, etc.) can represent a stream of thought or consciousness. Resulting patterns can be used to search for associated content in aggregate. For example, a compilation of video gamers' association reason objects can be leveraged to identify content that might be of interest to other games.

Association reason objects can also be used to initiate purchases for goods or services based on identifying such products according to a person's reasoning, emotional movement or shifts, stream of consciousness, or other mental activities. Though observing link creators or a chain of association reason objects, the link analysis engine can identify which link creators make link associations in a similar fashion. This allows for ease of identification of goods or services. Example goods or service that can be purchased through link associations include cars, movies, music, tickets, mortgages, toys, sporting equipment or services, magazines, newspapers, clothing, food, buildings, real-estate, medicines, financial services, healthcare services, games, computing devices, chemicals, paints or coatings, cleaning supplies or services, fuels, veterinary goods or services, animals, hardware, tools or machine parts, software, appliances, vehicles, firearms or ammunition, jewelry, gems, precious metals, musical instruments, paper, leather, construction materials or services, furniture, kitchen ware, yarn or threads, fabrics, fancy goods, floor covering (e.g., carpet, tile, etc.), beer, wine, beverages, tobacco products, advertising services, insurance services, construction or repairing services, communications services, transport services, educational or amusement services, scientific services, manufacturing services, food services, or other types of goods or services. It should be appreciated that the act of initiating a transaction on a compute device can cause the link analysis engine to generate one or more association reason objects where the transaction is the link.

Association reason objects allow robots, web-bots, or other automated devices to learn preferences of other's intent or reasons for making decisions. For example, a healthcare robot can learn a patient's desired routine or a doctor's behaviors, a factory robot can infer exceptions to manufacturing protocols, a gaming bot can mimic a player, or the robot can learn other aspects of its environment through observation of the reason for interactions or linking. Thus, the robots or other digital learning agents can follow reasons of that relate to tasks at hand.

Association reason objects also enable vehicles (e.g., aircraft, spacecraft, trucks, cars, etc.) to aid in offering passengers recommendations based on a current context (e.g., stop for gas, stop for food, etc.). As opportunities arise nearby the vehicle, the vehicle can observe known association reason objects that relate to passenger reasoning as well as contextually relevant to the location, direction, heading, or other vehicular attributes.

Association reason objects can give rise to recommending media (e.g., art, music, video, books, articles, web pages, movies, etc.) to individuals based on their mental activates relative to others. The association reason objects from a link creator can be used to generate a query for content that has been linked for similar reasons. Thus, the inventive subject matter is considered to include determining a similarity measure among reason objects. Such a measure can be based on a reasoning ontology or hierarchy. The closer two reason objects are within the ontology, the more similar they are.

Association reason objects can serve as foundation element or trigger for advertising events that target individuals based on similar reasoning.

Association reason objects can also serve as a source of information to provision content, communications, transactions, or other activities among users.

Association reason objects can function as a *nexus* of communications among relevant parties. For example, an individual can be put in touch with other individuals having similar thought patterns. Further, an individual can be connected with servers that provide content that aligns with the individual's thought processes. In this sense, the association reason object can be considered a message board or communication portal that allows individuals to interact regarding the reason object. In such an embodiment, the association reason object can comprise additional features such as comment fields, links, or other features.

Association reason objects can also function as security measures. Should a change in an individual's trend in metal reasoning be detected, then the change in trend might be indication of identity theft or a problem with the individual's mental state.

Association reason objects can serve as a measure of alignment of individuals with respect to a group. Some groups, the Democratic or Republican Parties for example, wish to have their members' exhibit alignment with their respective platforms. Contemplated system can compare a member's reasons for generating links as compared to a group standard. A measure of the deviation from a collection of reason objects from a "standard" set is also considered part of the inventive subject matter.

Association reason objects also operate as an interaction point with interactive media (e.g., games, videos, audio books, web episodes, etc.). For example, a game engine can obtain reason objects generated by a player. As the game progresses, characters in the game make decisions; the decisions can be based on the player's reasons objects or even other entity's reasons objects. This allows for aligning a story with the thought processes of a consumer.

Association reason objects can be leveraged in education by illustrating proper reasoning techniques or by triggering lesson plans once a student has mastered a lesson.

Association reason objects can enable transactions based on precise marketing triggered on how an individual thinks or on the individual's mental actions as indicated by a reason object or a chain of reason objects. The transactions and marketing can be based the individual's reasons for interacting with content, or based on the individual's social network. Thus, the triggering of the transactions or marketing can be triggered on just the individual's reason information or aggregated reason information from a larger population, the individual's social network for example.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method of providing search results associated with linked content, the method comprising:
    storing, in a tangible non-transitory computer-readable memory of a reason database, association reason objects indexed by an attribute namespace,
        wherein each association reason object is derived from a motivation of creating a link pointer that points from a site location to a linked content, and
        wherein at least the link pointer and a link creator identifier form a link object corresponding to the association reason object;
    obtaining a query related to a query association reason object, wherein the query association reason object has attributes in the attribute name space;
    searching the reason database for similar association reason objects having similar attributes to the query association reason object according to the attribute namespace; and
    returning a search result of content, wherein that content in the search result correspond to the linked content from the similar association reason objects satisfying the query.

2. The method of claim 1, wherein the reason database comprises a chain of linked association reason objects.

3. The method of claim 2, further comprising associating a hash-based address to each of the linked association reason objects.

4. The method of claim 1, wherein returning the search result includes providing a media recommendation.

5. The method of claim 1, wherein the association reason objects comprise a mapping to at least one conceptual reason within the attribute namespace.

6. The method of claim 5, wherein the at least one conceptual reason comprises a mapping to an ontology.

7. The method of claim 5, wherein the at least one conceptual reason comprises a mapping to a concept map.

8. The method of claim 5, wherein the at least one conceptual reason comprises a mapping to a reason classification scheme in the attribute namespace.

9. The method of claim 8, wherein the reason classification scheme includes an entertainment domain classification.

10. The method of claim 8, wherein the reason classification scheme includes a gaming domain classification.

11. The method of claim 8, wherein the reason classification scheme includes at least one sub-class.

12. The method of claim 1, further comprising enabling a device to take an action based on the result set.

13. The method of claim 12, wherein the action comprises a subscription action.

14. The method of claim 13, wherein the subscription action is based on a reason classification.

15. The method of claim 12, wherein the action comprises a sentiment action.

16. The method of claim 15, wherein the sentiment action is based on at least one of the following: a like, a dislike, a thumb, and a tip.

17. The method of claim 1, further comprising storing the link object in a link database.

18. The method of claim 17, wherein the link database and the reason database comprise the same database.

19. The method of claim 1, wherein obtaining the query includes generating the query from the query association reason object.

20. The method of claim 1, wherein the attribute namespace comprises at least one of an ontology namespace and a hierarchal namespace.

21. The method of claim 20, wherein searching the reason database includes determining a similarity measure of the similar association reason objects relative to the query association reason object according to the ontology namespace or the hierarchical namespace.

22. A computer program product embedded in a non-transitory computer-readable medium comprising instructions for providing search results associated with linked content, which, when executed, configure one or more computer processors to perform a method comprising:
    storing, in a tangible non-transitory computer readable memory of a reason database, association reason objects indexed by an attribute namespace, wherein each association reason object is derived from a motivation of creating a link pointer that points from a site location to a linked content, and wherein at least the link pointer and a link creator identifier form a link object corresponding to the association reason object;

obtaining a query related to a query association reason object wherein the query association reason object has attributes in the attribute name space;

searching the reason database for similar association reason objects having similar attributes to the query association reason object according to the attribute namespace; and returning a search result of content, wherein that content in the search result correspond to the linked content from the similar association reason objects satisfying the query.

23. A computer-implemented system for providing search results associated with linked content, the system comprising:

a tangible non-transitory computer readable memory of a reason database configured to store association reason objects indexed by an attribute namespace, wherein each association reason object is derived from a motivation of creating a link pointer that points from a site location to a linked content, and wherein at least the link pointer and a link creator identifier form a link object corresponding to the association reason object;

at least one processor coupled with the memory and, upon execution of the software instructions for providing search results associated with linked content, is configured to:

obtain a query related to a query association reason object wherein the query association reason object has attributes in the attribute name space;

search the reason database for similar association reason objects having similar attributes to the query association reason object according to the attribute namespace; and return a search result of content, wherein that content in the search result correspond to the linked content from the similar association reason objects satisfying the query.

* * * * *